United States Patent Office 3,548,261

Patented Dec. 15, 1970

3,548,261

ARRANGEMENT FOR CONSTRUCTING ELECTRICAL CIRCUITS BY MEANS OF BOARD MOUNTED CONNECTOR PLATES

Robert F. Chambers, 504 Beverly Road, Newark, Del. 19711

Filed Apr. 22, 1969, Ser. No. 818,309
Int. Cl. H02b *1/04;* H05k *13/04*
U.S. Cl. 317—117 10 Claims

ABSTRACT OF THE DISCLOSURE

Arrangement for constructing electrical circuits includes support panel with plurality of mounting elements arranged in equally spaced apart rows and columns on panel. Plurality of mounting plates each has aperture therein for securing plates to mounting elements on support panel, and each mounting plate includes at least two electrical connectors equally spaced from aperture therein and electrically connected together. Electrical connectors of each mounting plate are in line with rows and columns of mounting elements on support panel when mounting plates are secured thereto. Each of at least plurality of board mounted electrical elements includes pair of equally spaced apart connectors that mate with connectors on mounting plates. Circuit is assembled by securing mounting plates to support panel at mounting elements thereon and interconnecting mounting plates with board mounted electrical elements.

BACKGROUND OF THE INVENTION

The present invention relates to electrical circuitry, and more particularly to an arrangement for constructing simple electrical circuits of the type used in the study of electrical science.

Prior to the present invention numerous constructions have been proposed for use by students in assembling electrical circuits. As is well known, such equipment plays an important role in the classroom instruction of electricity. However, for the most part, the heretofore available constructions have one significant drawback and this involves their utilization of electrically conductive flexible wiring to interconnect the various components of the circuit being assembled. Often, it is difficult for persons without formal training to interconnect the various components comprising the circuit. Moreover, the network of flexible wire makes it difficult and time consuming for the instructor to check the circuitry before the actual experiment is conducted. Although several developments have been proposed which eliminate the use of flexible wiring these systems are for the most part characterized by their cumbersome and complex nature. Accordingly, with existing equipment it is difficult for students to construct the circuitry required in studying the basic fundamentals of electricity. To be sure, the above disadvantages clearly bring into focus the significant need for circuitry which is easy to assemble and operate. It is also important that this circuitry be inexpensive to produce.

Accordingly, it is an object of the present invention to avoid the above disadvantages by providing an arrangement for constructing electrical circuitry which is easy to use by students without formal training in electrical wiring.

Another object of the present invention is to provide an arrangement for constructing electrical circuitry which enables the instructor to accurately check the circuitry at a glance.

Another object of the present invention is an electrical circuit arrangement which takes the same form as the schematic diagram used to assemble the circuit.

Still another object of the present invention is to provide an arrangement for constructing an electrical circuit which is easy to understand and use, and inexpensive to manufacture.

SUMMARY OF THE INVENTION

In accordance with the present invention an arrangement for constructing an electrical circuit comprises a support panel with a plurality of mounting elements arranged in equally spaced apart rows and columns on the panel. A plurality of mounting plates cooperate with the support panel, and each plate has an aperture therein for securing the plate to one of the mounting elements on the panel. Also, each mounting plate includes at least two electrical connectors equally spaced from the aperture therein and electrically connected together. The electrical connectors of the mounting plates are in line with the rows and columns of the mounting elements on the support panel when the mounting plates are secured thereto. The present arrangement also includes at least a plurality of board mounted electrical elements, and each element of the plurality has a pair of equally spaced apart connectors that mate with the connectors on the mounting plates. A circuit is assembled by securing the mounting plates to the support panel at the mounting elements thereon and interconnecting the plates with the plurality of board mounted electrical elements.

The electrical connectors on each mounting plate may comprise sockets and the connectors on each board mounted electrical element of the plurality can be pins that mate with the sockets. Moreover, the mounting elements on the support panel may be elongate and extend outwardly from the plane of the panel. Also, the board mounted electrical elements may be selected from the group consisting of resistors, capacitors, switches, meters, electrically conductive wires and the like.

The plurality of mounting plates includes a variety of different forms and each of the electrical connectors thereon is equally spaced from the aperture in the plate. One mounting plate includes a pair of electrical connectors in alignment with and on opposite sides of the aperture in the plate. Another mounting plate also includes a pair of electrical connectors spaced ninety degrees from each other with respect to the aperture therein. Another mounting plate has three electrical connectors spaced ninety degrees from each other. Still another mounting plate includes four equally spaced apart electrical connectors electrically connected together. Alternatively, the four connectors may be connected together in pairs and the mounting plate color coded to indicate the pairs that are connected together.

The distance between the electrical connectors on each board mounted electrical element of the plurality is equal to the distance between adjacent mounting elements on the support panel less twice the distance between the aperture and one of the electrical connectors on the mounting plates.

BRIEF DESCRIPTION OF THE DRAWING

Novel features and advantages of the present invention in addition to those mentioned above will become apparent to one skilled in the art from a reading of the following detailed description in conjunction with the accompanying drawing wherein.

DETAILED DESCRIPTION OF THE INVENTION

Figures 2, 3, 14:
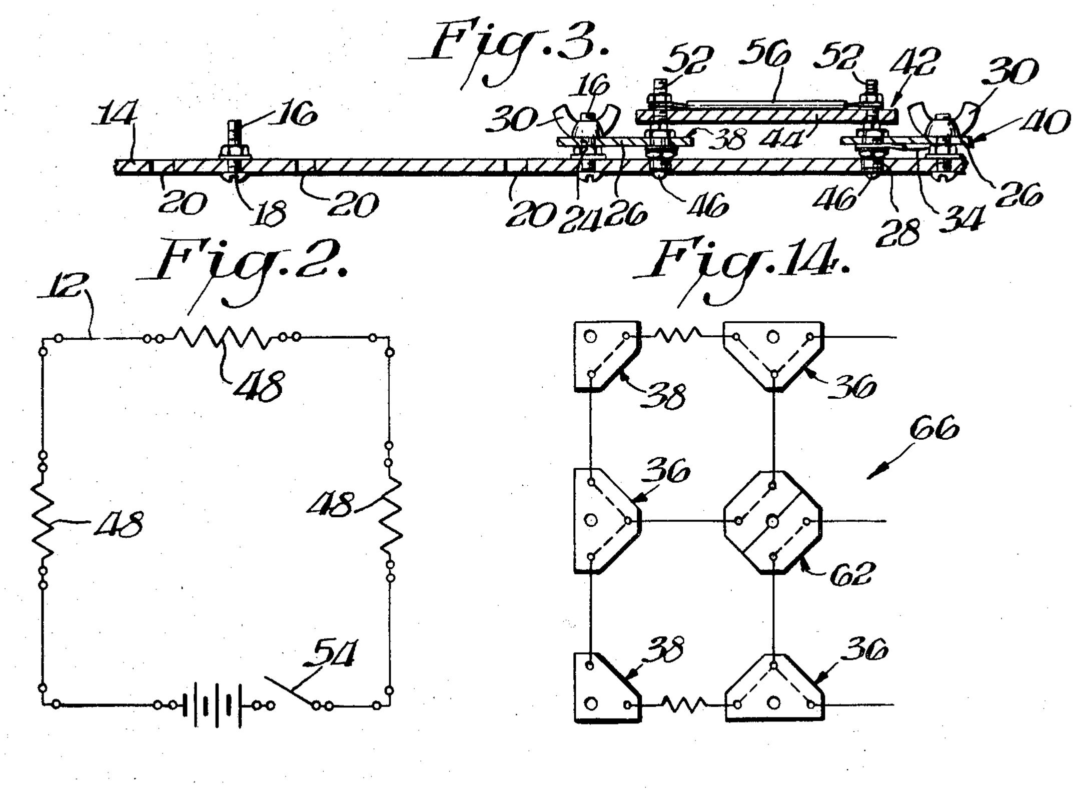
FIG. 2 is an electrical schematic of the circuit illustrated in FIG. 1.
FIG. 3 is a sectional view taken along line 3—3 of FIG. 1.
FIG. 14 is a diagrammatic view of a circuit utilizing the mounting plate illustrated in FIGS. 12 and 13.

Referring in more particularity to the drawing, an arrangement 10 for constructing an electrical circuit, such as series circuit 12, comprises a support panel 14 with a plurality of mounting elements 16 arranged in equally spaced apart rows and columns on the panel. The support panel is fabricated from sheet-like material, such as hardboard, for example, and apertures 18 are drilled or otherwise provided in the panel in predetermined manner so that each aperture is equally spaced from the adjacent apertures in the horizontal rows and vertical columns. Each mounting element 16 is secured at one of the apertures 18 in the support panel, and as best shown in FIG. 3, the mounting elements may take the form of stove bolts secured to the support panel so that the bolts extend outwardly from the plane of the panel. Each mounting element on the support panel is surrounded by four equally spaced apart openings 20 in alignment with the row and column lines on the panel. Additionally, each of the openings 20 is equally spaced from the center of the mounting element it surrounds.

Figures 4, 5, 6, 7, 8, 9, 10, 11, 12, 13:
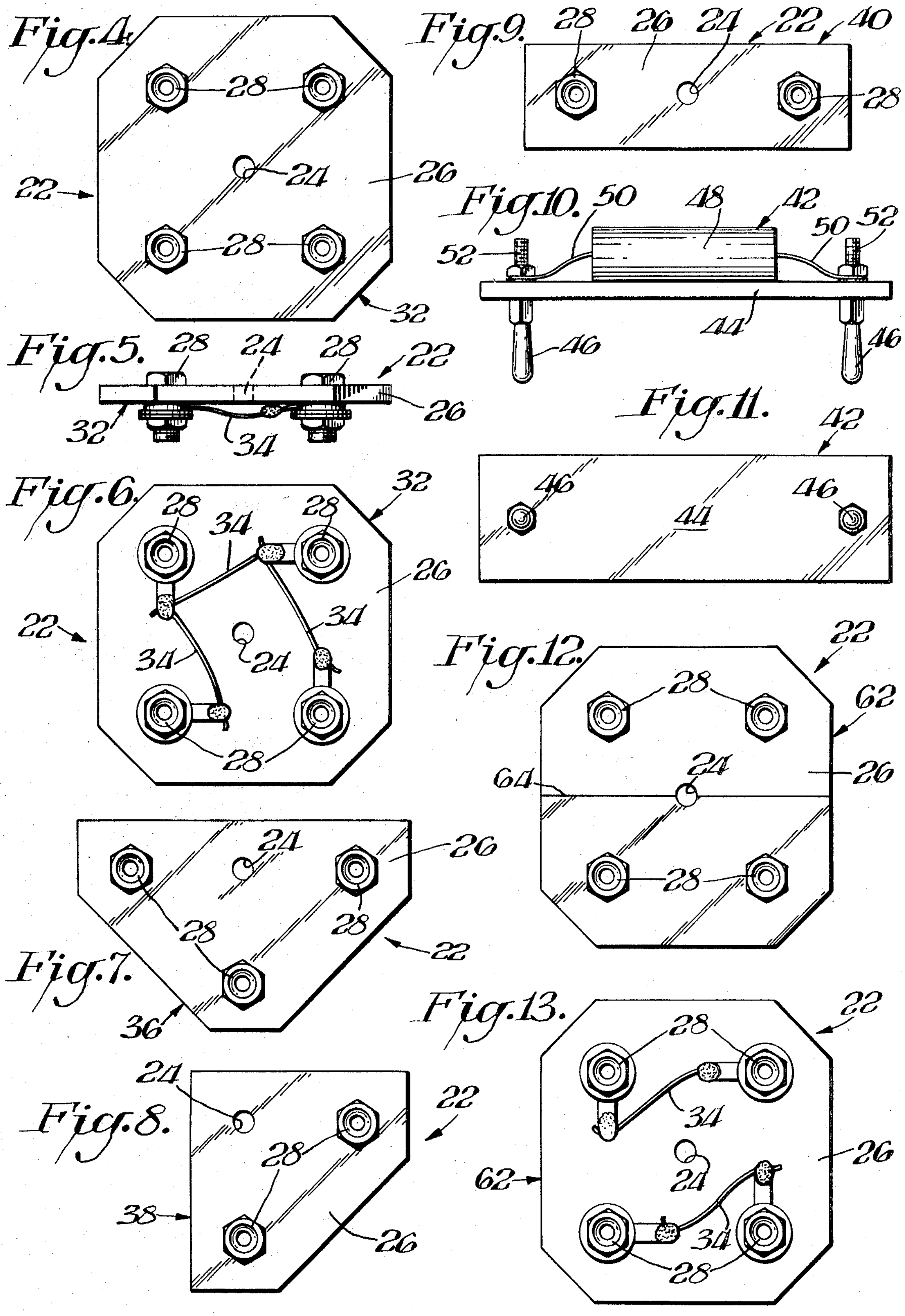
FIG. 4 is a top plan view of a mounting plate according to the present invention.
FIG. 5 is a side elevational view of the mounting plate shown in FIG. 4.
FIG. 6 is a bottom plan view of the mounting plate shown in FIGS. 4 and 5.
FIG. 7 is a top plan view of another mounting plate according to the present invention.
FIG. 8 is a top plan view of still another mounting plate according to the present invention.
FIG. 9 is a top plan view of another mounting plate according to the present invention.
FIG. 10 is a side elevational view of a board mounted electrical element according to the present invention.
FIG. 11 is a bottom plan view of the board mounted electrical element shown in FIG. 10.
FIG. 12 is a top plan view of still another mounting plate according to the present invention.
FIG. 13 is a bottom plan view of the mounting plate shown in FIG. 12.

The arrangement 10 for constructing electrical circuitry also includes a plurality of mounting plates 22 each having an aperture 24 for securing the plates to the mounting elements 16 on the support panel 14. Each mounting plate 22 comprises a flat sheet-like support body 26 with a plurality of electrical connectors 28 secured to the body, as best shown in FIG. 5. Preferably, the electrical connectors on each mounting plate take the form of sockets for receiving banana jacks when the desired circuit is assembled, as explained more fully below. The plurality of mounting plates includes connector arrangements for two, three and four-way common connections. Moreover, in each of these constructions the connectors 28 are equally spaced from one another and the aperture 24 in the plate. When the plates are secured to the mounting elements 16, such as with wing nuts 30, the connectors 28 are aligned with the rows and columns of mounting elements on the support panel. Those portions of the connectors which extend outwardly from the back surface of the support body 26 fit into the openings 20 that surround the mounting elements 16 to thereby insure proper alignment of the connectors with the rows and columns of mounting elements.

FIGS. 4–6 show a mounting plate 32 for connecting four incoming lines. As shown best in FIG. 6, the four socket-type connectors 28 are electrically connected together by wiring 34 soldered to the connectors 28 at the back surface of the support body 26. FIGS. 7, 8 and 9 illustrate mounting plates 36, 38, and 40 which are utilized for interconnecting two and three incoming lines. The connectors in each of these mounting plates are connected together in the same manner as described above in conjunction with mounting plate 32. It is important to note that in each mounting plate construction the connectors 28 are equally spaced from the aperture 24. Also, the connectors are arranged for alignment with the rows and columns of mounting elements on the support panel when the mounting plates are secured to the panel with the wing nuts 30.

The arrangement 10 of the present invention further includes at least a plurality of board mounted electrical elements 42 that cooperate with the mounting plates 22 when the desired circuitry is assembled. Each board mounted electrical element of the plurality includes a flat sheet-like support body 44 with a pair of equally spaced apart connectors 46 connected to the support body 44 as best shown in FIG. 10. The connectors 46 of the board mounted electrical elements are banana jacks that mate with the socket-type connectors 28 on the mounting plates when the desired circuit is assembled. The front surface of the support body 44 carries an electrical component, such as the resistor 48 illustrated in FIG. 10. The lead wires 50 of the resistor 48 are attached to the mounting post portions 52 of the banana jacks which portions extend outwardly from the front surface of the support body 44. In addition to board mounted resistors the electrical elements also include capacitors (not shown), switches 54, meters (not shown), electrically conductive wires 56, and most any electronic device.

It is important that the spacing between the pair of banana jacks 46 on each board mounted electrical element 42 of the plurality be equal. Also, the spacing between the jacks has a definite relationship with the spacing between the mounting elements 16 on the support panel 14 as well as with the distance between the apertures in the mounting plates and the electrical connectors 28 that surround the apertures. Basically, the distance between the banana jacks 46 on each board mounted electrical element of the plurality is equal to the distance between adjacent mounting elements 16 on the support panel 14 less twice the distance between the apertures 24 and the electrical connectors 28 on the mounting plates. Moreover, since the circuitry does not utilize flexible wiring to interconnect the various electrical components it is easy to accurately check the circuit at a glance. Additionally, the assembled circuitry is more meaningful to the student because it takes the same form as the schematic diagram used to assemble it.

Figure 1:
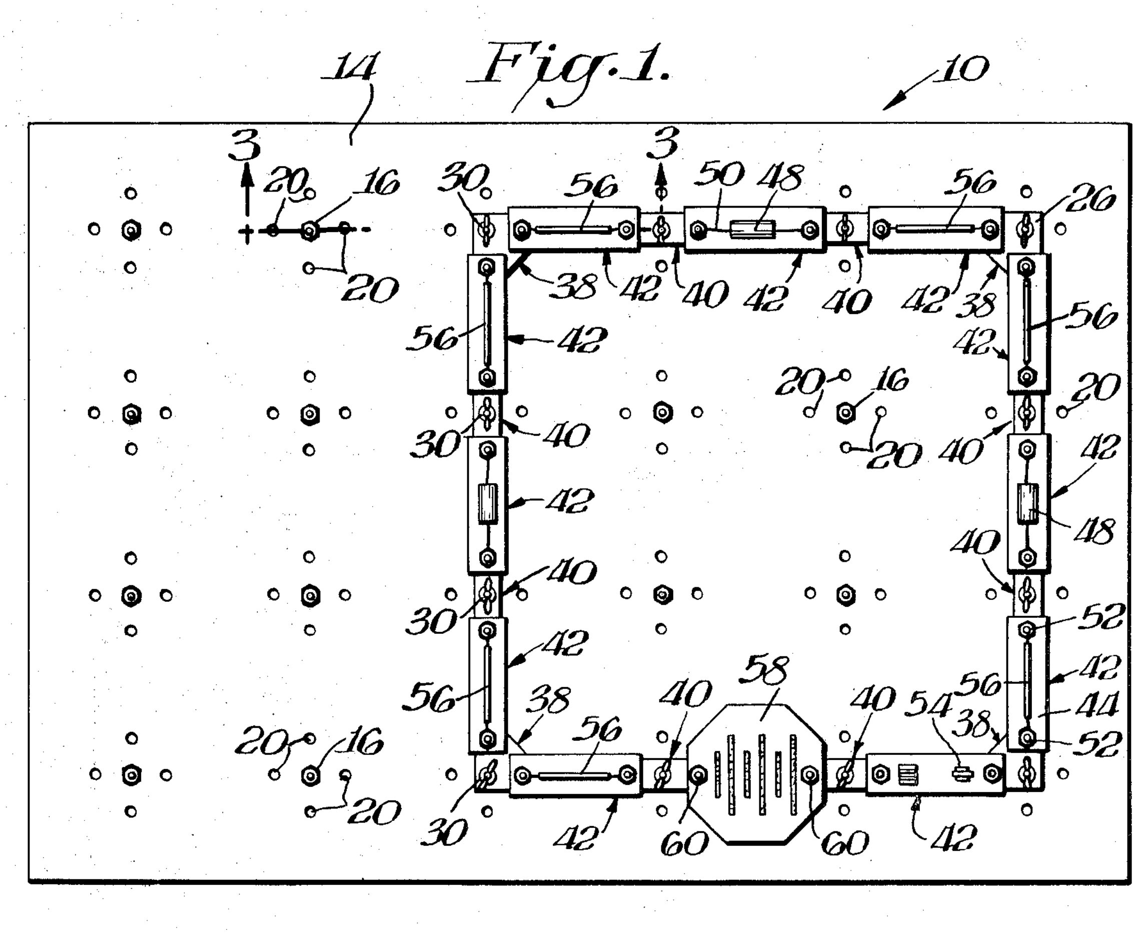
FIG. 1 is a top plan view of an arrangement for constructing electrical circuitry according to the present invention.

Turning now to FIGS. 1–3, the circuit 12 may be utilized in the study of electricity for determining the voltage distribution in a single circuit loop. This simple series circuit includes a power source (not shown), switch 54, three resistors 48, and board mounted electrically conductive wire 56. The wire interconnects the resistors and the switch with the power source. In FIG. 1, the power source is diagrammatically represented by a plate 58 having spaced apart posts 60 to which a source of D.C. current is conveniently connected. Needless to say, the posts 60 are not electrically connected together and the plate 58 may be eliminated if desired. The circuit 12 is assembled by first securing the desired mounting plates 22 to the mounting elements 16 on the support panel 14. The plates are secured in predetermined manner prior to plugging in the various board mounted electrical elements 42, and wing-nuts 30 are conveniently utilized to secure the plates to the mounting elements on the support panel, as best shown in FIG. 3. Next, the various board mounted electrical elements 42 are fitted into place by inserting the banana jacks 46 into the socket-type connectors 28 on the mounting plates 22. As is well known, after the switch 34 is closed the voltage across each of the resistors is measured with an appropriate meter, and the measured voltage values are then compared with the theoretical voltage drops across the resistors.

FIGS. 12 and 13 illustrate a mounting plate 62 which in many respects is similar to the plate 32 shown in FIGS.

4–6. However, unlike plate 32 the socket-type electrical connectors 28 are connected in pairs by wiring 34 rather than a four-way common connection. The front surface of the support body 26 of plate 62 is divided in half by a line 64, and the half portions of the front surface are color coded as with different coloring schemes so as to visually identify the connectors 28 which are electrically connected together. FIG. 14 diagrammatically illustrates the use of the mounting plate 62 in a series-parallel circuit 66. Additionally, the mounting plate 62 may be utilized whenever it is desired to interconnect four incoming lines so that one pair of lines is electrically unconnected to the other pair.

What is claimed is:

1. An arrangement for constructing an electrical circuit including a support panel having a plurality of mounting elements arranged in equally spaced apart horizontal rows and vertical columns on the panel with each mounting element equally spaced from each of its adjacent elements that align in horizontal and vertical directions, a plurality of mounting plates each having an aperture therein for releasably securing the plates to the mounting elements on the support panel, each mounting plate including at least two electrical connectors equally spaced from the aperture therein and electrically connected together, the electrical connectors of each mounting plate being in line with the rows and columns of mounting elements on the support panel when the mounting plates are secured thereto, and at least a plurality of board mounted electrical elements, each element of the plurality having a pair of equally spaced apart connectors that mate with the connectors on the mounting plates, the distance between the electrical connectors on each board mounted electrical element of the plurality being equal to the distance between adjacent mounting elements on the support panel that align in horizontal and vertical directions less twice the distance between the aperture and one of the electrical connectors on the mounting plates whereby a circuit is assembled by securing the mounting plates to the support panel at the mounting elements thereon and interconnecting the mounting plates with the plurality of board mounted electrical elements.

2. An arrangement for constructing an electrical circuit as in claim 1 wherein the electrical connectors on each mounting plate comprise sockets and the electrical connectors on each board mounted electrical element of the plurality comprise pins that mate with the sockets.

3. An arrangement for constructing an electrical circuit as in claim 1 wherein the mounting elements on the support panel are elongate and extend outwardly from the plane of the panel.

4. An arrangement for constructing an electrical circuit as in claim 1 wherein the plurality of mounting plates includes at least one plate with a pair of electrical connectors in alignment with and on opposite sides of the aperture therein.

5. An arrangement for constructing an electrical circuit as in claim 1 wherein the plurality of mounting plates includes at least one plate with a pair of electrical connectors spaced ninety degrees from each other with respect to the aperture in the plate.

6. An arrangement for constructing an electrical circuit as in claim 1 wherein the plurality of mounting plates includes at least one plate with three electrical connectors and each electrical connector is equally spaced from the aperture in the plate.

7. An arrangement for constructing an electrical circuit as in claim 1 wherein the plurality of mounting plates includes at least one plate with four equally spaced apart electrical connectors.

8. An arrangement for constructing an electrical circuit as in claim 7 wherein the four equally spaced apart connectors are electrically connected together.

9. An arrangement for constructing an electrical circuit as in claim 7 wherein the four equally spaced apart connectors are electrically connected together in pairs.

10. An arrangement for constructing an electrical circuit as in claim 9 wherein the mounting plate with four equally spaced apart electrical connectors is color coded to indicate the pairs of electrical connectors that are connected together.

References Cited

UNITED STATES PATENTS

| | | | |
|---|---|---|---|
| 1,918,525 | 7/1933 | Eckenrode | 317—99X |
| 2,885,602 | 5/1959 | Emerson | 317—101 |

FOREIGN PATENTS

| | | | |
|---|---|---|---|
| 1,301,953 | 7/1962 | France | 35—19.1 |

LEWIS H. MYERS, Primary Examiner

G. P. TOLIN, Assistant Examiner

U.S. Cl. X.R.

35—19.1; 317—101; 339—125